United States Patent [19]

Wilfinger et al.

[11] Patent Number: 4,730,020

[45] Date of Patent: Mar. 8, 1988

[54] WATER-DILUTABLE COATING COMPOSITIONS FOR BASE COATS FOR WET-ON-WET APPLICATION OF CLEAR COAT ON BASE COAT

[75] Inventors: Werner Wilfinger; Herbert Zima, both of Graz; Herbert Stania, Feldkirchen, all of Austria

[73] Assignee: Vianova Kunstharz, A.G., Werndorf, Austria

[21] Appl. No.: 833,162

[22] Filed: Feb. 27, 1986

[30] Foreign Application Priority Data

Feb. 27, 1985 [AT] Austria ................................ A571/85

[51] Int. Cl.$^4$ ............................................. C08F 20/58
[52] U.S. Cl. ...................................... 524/555; 526/304
[58] Field of Search ......................... 524/555; 526/304

[56] References Cited

U.S. PATENT DOCUMENTS

| | | | |
|---|---|---|---|
| 4,195,005 | 3/1980 | Brown | 524/555 |
| 4,239,671 | 12/1980 | Fink | 524/555 |
| 4,336,172 | 6/1982 | Marquardt | 524/555 |
| 4,431,769 | 2/1984 | Yoshida | 524/555 |
| 4,442,257 | 4/1984 | Borovicka | 524/555 |

*Primary Examiner*—Paul R. Michl
*Assistant Examiner*—Lee C. Wright
*Attorney, Agent, or Firm*—A. W. Breiner

[57] ABSTRACT

Water-dilutable coating compositions comprising a combination of specifically selected acrylic copolymers, dissolved in a specifically defined solvent blend, combined with coloring and/or optical effect imparting pigments, and, optionally, polymer dispersions and amine resins, are described. The compositions when used as a base coat for wet-on-wet application of a multi-coat paint system exhibit excellent performance on application and give finishes with outstanding properties.

11 Claims, No Drawings

WATER-DILUTABLE COATING COMPOSITIONS FOR BASE COATS FOR WET-ON-WET APPLICATION OF CLEAR COAT ON BASE COAT

FIELD OF INVENTION

The present invention is concerned with water-dilutable coating compositions. More particularly, the invention relates to coating compositions primarily for use as the base or first coat of a multi-coat system where there is wet-on-wet application of a clear coat on the first or base coat, particularly with base coats containing metallic pigments, based on acrylic copolymers.

BACKGROUND AND PRIOR ART

In automobile coating, as well as in other fields which require coatings with good decorative quality with simultaneous good corrosion protection, it is normal to coat the substrates with a number of coatings. At the present time, finishing coatings are applied in two steps. First, a pigmented coat (base or first coat) is applied, followed by a transparent finish, normally a clear coat, containing no, or only transparent pigments. To impart a metallic effect to the finish, the base coat contains metallic pigments.

Presently in industrial automobile coating, coating compositions are used which contain a high level of organic solvents. For economical and ecological reasons substantial efforts have been made to reduce the organic solvents to the greatest extent possible. Thus, coating compositions have been developed containing mainly water as the dispersing medium and only small quantities of organic solvents. Specifically, U.S. Pat. No. 3,862,071 discloses a water-dilutable binder system for metallic enamels containing a water-soluble acrylic copolymer and hexamethoxymethylmelamine, partially neutralized with amines and thus dispersed. The essential property of a paint binder for metallic pigments, i.e., the fixation of the metallic pigment particles in a position favorable for optical effect, is achieved in this case by the addition of a water-insoluble copolymer. According to GB-PS No. 2,073,609, the desired optical effect is achieved by using internally crosslinked copolymer dispersions ("microgels") in the base coat. According to EP-A No. 1 00 29 597, the desired optical effect is achieved by providing a partially dispersed character to the water-soluble acrylic copolymer by using a balanced ratio between hydroxy and carboxy groups. Efforts have also been made to obtain the required performance of the base coat by co-employing polyurethane dispersions as disclosed in DE No. 32 10 051 or by the introduction of cellulose esters as disclosed in DE No. 32 16 549.

In all of those previously known systems the rheological properties necessary for the orientation and fixation of the highly anisotropic metallic pigment flakes to give the desired metallic effect are obtained through the presence of partially dispersed binder and additional components which influence the rheology, such as thixotropic agents or extenders. These measures, however, either adversely influence the storage stability and the applicational properties, particularly when application is with electrostatic high rotation atomizers, or the weather resistance of the film.

SUMMARY AND GENERAL DESCRIPTION OF INVENTION

Surprisingly it has now been found that water-dilutable compositions primarily for use in base coats in a multicoat system which incorporates acrylic resins, particularly for metallic enamels, can be formulated without having the disadvantages of the known products, if the formulations contain a select binder and a specific combination of solvents.

Thus, the present invention is concerned with water-dilutable coating compositions for use in base or first coats for wet-on-wet application of finishes, containing pigments and optionally extenders, auxiliary organic solvents and conventional paint additives, and particularly for base coats containing metallic pigments, which are based on acrylic copolymers, characterized in that the base or first coat contains (A) 10–40% by weight (b.w.), preferably 15–30% b.w., of at least one copolymer with a glass transition temperature of between $-55°$ C. and $+25°$ C., and preferably between $-50°$ C. and $0°$ C., and contains (Aa) 40–60% b.w. of vinyl and vinylidene compounds carrying no functional groups other than the $\alpha,\beta$-ethylenically unsaturated group, (Ab) 30–40% b.w. of hydroxyalkyl esters of (meth)acrylic acid, maleic acid or fumaric acid, and/or (Ac) 30–40% b.w. of N-methylol(meth)acrylic acid amide, (Ad) 2–17% b.w. of (meth)acrylic acid amide, (Ae) 0–8% b.w. of $C_1$–$C_4$-alkoxymethylated N-methylol(meth)acrylic acid amide, (Af) 2–8% b.w. of $\alpha,\beta$-ethylenically unsaturated monocarboxylic acids, preferably (meth)acrylic acid, and (Ag) 0–0.8% b.w. of a multiple $\alpha,\beta$-ethylenically unsaturated compound, preferably divinylbenzol, with the condition that a 60% solution of the copolymer in ethanol, after neutralization of the carboxy groups with ammonia to a pH-value of 7.2 to 7.5 (measured as a 20% solution in water) can be diluted with water to provide a clear solution, or with a slight turbidity only, to a solids content of 20% and that the solution, on dilution with water, to a solids content of from 25–40% has a maximum viscosity of over 5 Pa.s, (B) 5–40% b.w., preferably 15–35% b.w., of a mixture of (Ba) 20–80% b.w. of one or more solvents with an evaporation number, DIN 53 170, of below 30, and (Bb) 20–80% b.w. of one or more solvents with an evaporation number of over 60, completely miscible with water at ambient temperature, but not miscible with benzine hydrocarbon solvents having a boiling range of from 80° to 110° C. and a maximum content of aromatic hydrocarbons of 5%, (C) 1–30% b.w. of one or more coloring and/or optical effect imparting components, (D) 0–20% b.w., preferably 5–15% b.w., of one or more dispersions stable in the paint composition, based on vinyl polymers, polycondensates or polyaddition resins, and (E) 0–20% b.w., preferably 3–12% b.w., of one or more partially or totally etherified amine-formaldehyde condensates.

The invention is particularly concerned with the use of the compositions as above described as the base or first coat for wet-on-wet application of a clear coat onto the base coat, particularly for metallic finishes.

The compositions of the invention give, particularly when used with metallic pigments, coatings with especially good metallic effect, because they lead to a very favorable orientation and fixation of the metallic pigments in the paint film. Even with conventional non-metallic pigments, the coatings have an excellent decorative appearance. It is a special advantage of the coating compositions of the invention that they are not dissolved, or are dissolved to a slight degree only, by the next coat, if it is only pre-dried and not yet fully cured.

The components of the base coats of the present invention are as follows:

Component (A) is a polymer produced in known manner by polymerization in solution. The polymer, as above stated, has a glass transition temperature (Tg) of between −55° C. and +25° C., and preferably a glass transition temperature of between −50° C. and 0° C. A close approximate calculation of the glass transition temperature of the copolymers can be made from the glass transition temperature of the monomers used according to the following equation:

$$\frac{1}{Tg} = \sum_{i=1}^{i} \frac{K_i}{Tg_i}$$

Tg = glass transition temperature of the copolymer in °K $Tg_i$ = glass transition temperature of the homopolymer of monomer i in °K $K_i$ = proportion of the monomer i in the copolymer in percent by weight.

In the formulation of the copolymers (Component A), the following groups of monomers are used: 40-60% of the monomer constituents are vinyl or vinylidene monomers carrying no functional groups other than α,β-ethylenically unsaturated double bonds (Group A). Among these are the $C_1-C_{12}$- alkanol esters of acrylic and methacrylic acid, and aromatic monomers such as styrene, vinyl toluene, p-tert. butylstyrene, and similar materials.

Further constituents of Component (A) are 30 to 40% of $C_2-C_4$- hydroxyalkyl esters of acrylic or methacrylic acid (Group Ab). Preferred components are hydroxyethyl(meth)acrylate and 2-hydroxypropyl(meth)acrylate. This group may, to advantage, be replaced in part by N-methylol(meth)acrylic acid amide (Group Ac).

A next group are 2-17% b.w. of (meth)acrylic acid amide (Group Ad) and 0-8% b.w. of $C_1-C_4$- alkoxylated (meth)acrylic acid amides (Group Ae).

The carboxy groups necessary to achieve water-solubility upon at least partial neutralization are introduced by using 2-8% b.w. of α,β-ethylenically unsaturated carboxylic acids, particularly of acrylic or methacrylic acid (Group Af).

Optionally, the monomer composition may contain in addition up to 0.8%, based on total monomer content, of a multiple α,β-ethylenically unsaturated compound. The preferred compound is divinylbenzol. Other monomers of this type are the di- or triacrylates, such as ethyleneglycol dimethacrylate or propane-triol trimethacrylate.

The weight ratios are selected within the given weight ratios in order that the copolymers, upon neutralization of a 60% solution with ammonia to a pH-value of 7.2 to 7.5, upon dilution to 20% b.w. with water, give a clear or, at the most, a slightly turbid solution. It is essential for the resins of Component (A) that their solubility characteristics remain unchanged when a polyfunctional monomer of Group (Ag) is used.

A further criterion for the copolymers are their viscosity characteristics. With appropriate selection of the ratio between the ionic groups and the other monomers, the polymers used according to the invention show, on dilution with water, upon adjustment of the pH-value with ammonia to 7.2 to 7.5 a strong rise in viscosity which must reach a maximum of over 5 Pa.s at a solids content of between 25 and 40%.

The claimed solvent blend Component (B) is essential for the present invention. It is used at a level of from 10 to 40% b.w. Preferably, 20 to 35% b.w. of the solvent blend are employed.

The solvent blend contains 20 to 80% of one or more solvents with an evaporation number according to DIN 53 170 of below 30 (Group Ba) and one or more solvents with an evaporation number of over 60 (Group Bb), the solvents of Group (Bb) being totally miscible with water at ambient temperature, however, immiscible with a specified benzine hydrocarbon. The benzine hydrocarbon is defined by a boiling range of from 80 to 110° C. and a maximum content of aromatic hydrocarbons of 5%.

Group (Ba) includes solvents such as methanol, ethanol, propanol, acetone, dioxane, and propyleneglycol monomethylether. The preferred solvent in this group is ethanol. The solvents of this group can serve as the polymerization medium for Component (A), either partly or totally.

Examples of Group (Bb) solvents are the glycols and glycol ethers, such as ethyleneglycol, diethyleneglycol, diethyleneglycol monomethylether, and diethyleneglycol monoethylether. A particularly preferred solvent is N-methylpyrrolidone.

Immiscibility of the solvents is tested by mixing equal parts of solvent and specified benzine hydrocarbon at ambient temperature and is reflected by a relatively quick separation of the phases.

The coloring and optical effect imparting Components (C), amounting to 1 to 30% of the coating composition, are, depending on the intended use, i.e., either for solid color films or metallic films, the conventionally known inorganic or organic pigments or dyestuffs or metallic pigments or a combination of these materials. Examples of dyestuffs and pigments are titanium dioxide, graphite, carbon black, zinc chromate, strontium chromate, barium chromate, lead chromate, lead cyanamide, lead silico chromate, zinc oxide, cadmium sulfide, chromium oxide, zinc sulfide, yellow nickel titanium, yellow chromium titanium, red iron oxide, black iron oxide, ultramarine blue, phthalocyanine complexes, amaranth, quinacridones, and halogenated thioindigo pigments. The particularly preferred pigments are metal pigments, used singularly or as mixtures, such as copper, copper alloys, aluminum, steel, preferably aluminum in at least a predominant proportion, at a level of from 0.5 to 25% b.w., based on the total binder content of the coating composition. When mixtures of one or more non-metal pigments or dyestuffs are used, the proportion of the metal pigment is chosen so as not to suppress the metallic effect.

In order to obtain favorable properties with regard to application (spraying) and a quicker set of the base coat through physical drying, the paint compositions may contain up to 20% of an aqueous polymer dispersion or mixtures of such dispersions (Component D). It is evident that the dispersions which may be based on polymers, polycondensates or polyaddition resins, must be stable in the total paint composition. This applies in particular to the pH-value, the solvents and the pigments and extenders. Preferred dispersions are poly(meth)acrylates or styrene-acrylate copolymer dispersions available commercially in great number. Further, dispersions based on polyesters and, to special advantage in some cases, polyurethane dispersions can be used. The preferred level for all dispersions ranges between 5 and 15% b.w. of the composition.

In order to provide crosslinking in the paints, the paints will contain up to 20% b.w. of an amine-formaldehyde condensate, unless they have a sufficient extent of internal crosslinking properties (Component E). The preferred range for this component lies between 3 and 12% b.w. based on the total composition. The preferred condensates are melamineformaldehyde condensates, the methylol groups of which are partly or completely etherified with methanol.

In the preparation of the coating composition, the copolymer (A), present as a solution, preferably in ethanol, is neutralized with an amine, preferably a tertiary alkanol amine, such as dimethyl- or diethylethanol amine, to a pH-value of from 7.0 to 7.5. Color pastes with pigments and extenders are made with a part of the neutralized Component (A) on conventional dispersion equipment such as sand mills, pearl mills, and ball mills. If necessary, portions of water and/or solvents of Component (B) or of the amine resin (Component E) can be added. Further, dispersing and wetting aids can be co-employed. It is advisable to pre-disperse metal pigments with a part of the solvents of Component (B). The thus obtained coloring pastes are mixed with the rest of Component (A) and amine resin (E) and diluted with the rest of the solvent blend of (B) and with water. Then Component (D), if used, is added and the pH-value is adjusted to 6.5–9.0, preferably 7.0–8.0. Solids content and viscosity are adjusted to the conditions of application.

The finished paint compositions normally have a solids content of from 10 to 30% and an efflux time, DIN 53 211/20° C., of 13 to 25 seconds, preferably 15 to 18 seconds. The water content ranges between 50 and 80% b.w., and the organic solvents content ranges between 10 and 40% of the total paint composition.

The coating compositions of the invention may also contain other conventional paint additives such as thickening agents, extenders, plasticizers, stabilizers, light stabilizers, wetting agents, waxes, antifoams and catalysts, singly or a multitude of them, at the conventional levels. Other solvents, normally used in the paint industry, as is evident, can only be co-employed at a level so as not to impair the rheological properties of the coating composition.

The application of the base coat may be carried out using conventional equipment. When applying metallic base coats by compressed air spraying, the metallic effect is particularly uniform and light. The paints may also be applied by electrostatic spraying or air-assisted electrostatic spraying or combined methods as known in the art. The coating compositions of the invention exhibit excellent applicational properties on spraying. The favorable characteristics are mainly due to the rheological properties of the polymer Component (A) in the aqueous medium which is enhanced by the selected solvent system (B).

After a flash-off time of 5 to 10 minutes at room temperature, the films can be coated wet-on-wet with a transparent top coat. In certain cases, for example if a reduced flash-off time is desired, or with high humidity, it is advisable to provide a hot-blast zone prior to the application of the transparent top coat.

Suitable transparent top coats are the conventional solvent-dissolved paints, water-dilutable paints, or powder coatings. Particularly useful are two-component clear varnishes based on acrylic and/or polyester resins cured with polyisocyanates, or one-component clear varnishes based on acrylic and melamine resins. The multiple coat is cured at the temperature required for the clear top coat.

PRESENTLY PREFERRED EMBODIMENTS OF INVENTION

The following examples illustrate the invention without limiting the scope thereof. Parts and percentages are by weight unless otherwise stated.

Preparation and Characteristics of the Components and Additives Used in the Examples (1) Preparation of the Copolymers (Component A)

Weight and specifications of the starting materials are listed in Table 1. The component is prepared by solution polymerization according to known methods. A part of the polymerization medium is charged to the reaction vessel equipped with stirrer, reflux condenser, thermometer and addition vessel. At reflux temperature, the monomer blend, the rest of the solvent, and initiator and chain-transfer agent are continuously added within 4 hours. After another 3 hours of reaction time, additional quantities of initiator are added. After a further 2 hours, a part of the solvent is distilled off.

Table 1 is as follows:

TABLE 1

| | Composition and Specification of Component (A) | | | | | | | | | |
|---|---|---|---|---|---|---|---|---|---|---|
| | A 1 | A 2 | A 3 | A 4 | A 5 | A 6 | A 7 | A 8 | A 9(V) | A 10(V) |
| Solvent Charged | | | | | | | | | | |
| Ethanol | 431 | 431 | 431 | 466 | — | 453 | — | 431 | 309 | — |
| Isopropanol | — | — | — | — | — | — | 553 | — | — | 307 |
| Methoxypropanol | — | — | — | — | 752 | — | — | — | — | — |
| Monomer Blend | | | | | | | | | | |
| (Aa) Ethylacrylate | — | — | — | — | — | — | — | — | — | 425 |
| Methylmethacrylate | — | — | — | — | — | — | — | — | — | 425 |
| n-Butylacrylate | — | — | — | — | — | 200 | — | — | — | — |
| 2-Ethylhexylacrylate | 464.2 | 522 | 556 | 470 | 289 | — | — | 464 | 111 | — |
| n-Decylmethacrylate | — | — | — | — | — | — | 200 | — | — | — |
| Styrol | — | — | — | — | 289 | 200 | 200 | — | 111 | — |
| (Ab) Hydroxyethylacrylate | 334.6 | 323 | 326 | 170 | 417 | 185 | 185 | 334.6 | 160 | — |
| Hydroxyethylmethacrylate | — | — | — | — | — | — | — | — | — | 50 |

TABLE 1-continued

| Composition and Specification of Component (A) | A 1 | A 2 | A 3 | A 4 | A 5 | A 6 | A 7 | A 8 | A 9(V) | A 10(V) |
|---|---|---|---|---|---|---|---|---|---|---|
| 2-Hydroxypropylmethacrylate | — | — | — | — | — | 185 | 185 | — | — | — |
| (Ac) N—Methylolmethacrylamide | — | — | — | 165 | — | — | — | — | — | — |
| (Ad) Methacrylamide | 145.6 | 67.6 | 33.7 | 115 | 105 | 150 | 150 | 145 | 40.5 | — |
| (Ae) Butoxymethylmethacrylamide | — | — | — | — | 88 | — | — | — | 34 | — |
| (Af) Acrylic Acid | 30.2 | 47.3 | 47.8 | 60 | 52 | — | — | 30.2 | 20 | 100 |
| Methacrylic Acid | — | — | — | — | — | 80 | 80 | — | — | — |
| (Ag) Divinylbenzol | — | — | — | — | — | — | — | 11.7 | — | — |
| Solvent (in blend of addition) | | | | | | | | | | |
| Ethanol | 333 | 280 | 279 | 302 | — | 333 | — | 333 | 160 | — |
| Isopropanol | — | — | — | — | — | — | 333 | — | — | 360 |
| Methoxypropanol | — | — | — | — | 447 | — | — | — | — | — |
| Azodiisobutyrodinitrile (ABDN) | 12.5 | 12.1 | 11.5 | 12.0 | 15.8 | 12.0 | 12.0 | 12.5 | 6.0 | 13.0 |
| tert. Dodecylmercaptan | 2.1 | 2.0 | 1.9 | 2.0 | 2.6 | 3.0 | 3.0 | — | 1.0 | 2.2 |
| Additional ABDN | 4.0 | 4.0 | 4.0 | 2.0 | 5.3 | 2.0 | 2.0 | 4.0 | 2.0 | 2.0 |
| Solvent Distilled Off | 120 | 90 | 70 | — | — | — | — | — | — | — |
| Specification | | | | | | | | | | |
| Solids Content (%) | 60 | 60 | 60 | 56 | 51 | 56 | 53 | 50 | 50 | 60 |
| Tg (Calculated, °C.) | −34 | −43 | −48 | −19 | 0 | 22 | 21 | −34 | 0 | 36 |
| Viscosity Maximum Pa.s. on Dilution with Water (Solids Content 25–40%) | | | | | ←over 5→ | | | | | (x) |
| Appearance of 20% Solution (pH 7.2–7.5) | KL | LT | KL | LT | KL | LT | LT | KL | T | LT |

(x) no rise in viscosity on dilution
KL = clear
LT = slightly turbid
T = opaque (2) Composition and Characteristics of the Coloring and/or Optical Effect Imparting Component (C)

The following pigmented compositions are used in the examples:

| (C1) | 43.25 parts aluminum paste (1) |
| | 56.18 parts propyleneglycolmonomethylether |
| | 0.57 parts anionic wetting agent (2) |
| | 100.00 |
| | (1) Aluminum paste, type 4 according to ISO R 1247, ca. 68%, 99.99% pure aluminum, particle size under 44 μm, with special emulsifiers and stabilizers for use in aqueous paints (trade name TOYO 8160 SE, Toyo Aluminium KK, Japan). |
| | (2) High-molecular weight unsaturated carboxylic acid combined with paint-compatible silicone resin (effective substance 50%, clear yellow liquid, flash point ca. 28° C., trade name BYK P 104 S, BYK-Mallinckrodt, BRD). |
| (C2) | 24.40 parts copolymer (A3) |
| | 0.90 parts dimethylethanolamine |
| | 8.50 parts propyleneglycol monomethylether |
| | 0.30 parts anionic wetting agent (see C1 (2)) |
| | 8.30 parts N—methylpyrrolidone |
| | 57.60 TiO$_2$ (Rutile type) |
| | 100.00 |
| (C3) | 26.80 parts copolymer (A3) |
| | 5.30 parts dimethylethanolamine solution (10% in water) |
| | 61.10 parts water |
| | 0.30 parts anionic wetting agent (see C1 (2)) |
| | 6.50 parts Hostapermblau B3G (Hoechst AG, BRD) |
| | 100.00 |
| (C4) | same as (C3), but as coloring pigment 6.50 parts black (PRINTEX U) are used. |

(3) Characteristics of Dispersion Component (D)

(D1) Internally crosslinking, finely dispersed copolymer dispersion based on styrene/acrylate, solids content: ca. 45%; pH-value (DIN 53 785): 3–4; minimum filmforming temperature: 0° C., MOWILITH LDM 7130, Hoechst AG, BRD.

(D2) Aqueous one-component aliphatic polyurethane dispersion; solids content: ca. 34%; pH-value (DIN 53 785): 7.5–8.5; minimum film-forming temperature: under 0° C., NEO-REZ R-961, Polyvinyl Chemie, NL.

(D3) Medium viscous fine particle acrylic ester copolymer dispersion; solids content: ca. 46%; pH-value: 8–9; minimum film-forming temperature: ca. 40° C., MOWILITH LDM 7760, Hoechst AG, BRD.

(4) Specification of the Amine Resin Component (E)

(E1) Available, water-soluble melamine-formaldehyde-resin, partially etherified with methanol; average of methylol groups: ca. 5–6; etherified ca. 3–4; solids content 62%; solvent: diethyleneglycol dimethylether, RESYDROL ® WM 501, Vianova Kunstharz, Aktiengesellschaft, AT.

(E2) Available hexamethoxymethylmelamine, solids content: ca. 95%, MAPRENAL VMF 3904, Hoechst AG, BRD.

EXAMPLES 1–14

Composition and properties of the base coat of the base coat/top coat system are listed in Table 2. The components of the base coat are blended well by stirring in the listed sequence, and, if necessary, diluted with water to an efflux time of between 15 and 18 seconds (DIN 53 211/20° C.) and applied by spraying to a clean steel plate or to a CED-primer/filler system. The spraying is accomplished with a spray pistol (nozzle diameter 1.2 mm) with a spraying pressure of 6–7 bar in 3 runs. Prior to the coating with the clear top coat, the coat is dried at 60° C. for 5 minutes.

The clear top coat of the two-coat system has the following composition:

56.80 parts of an available, externally crosslinking acrylic resin, 60% solids in SHELLSOL A/butyl acetate, viscosity ca. 1000 mPa.s/25° C.; acid value 12–22 mg KOH/g, VIACRYL ® SC 341, Vianova Kunstharz, Aktiengesellschaft, AT;

22.90 parts of a melamine resin, etherified with isobutanol, 60% in butanol, viscosity ca. 800 mPa.s/25° C., VIAMIN® MF 514, Vianova Kunstharz, Aktiengesellschaft, AT;

13.75 parts of a hydrocarbon solvent, rich in aromatic constituents (boiling range 160° –182° C., aniline point 15° C., Kauri-butanol value 90), and 6.55 parts of butanol.

The clear top coat is diluted with a solvent to efflux time adjusted to 22 seconds (DIN 53 211/23° C.) and applied by spraying. A dried film thickness of 40 μm is obtained when stoved for 25 minutes at 140° C. The properties of the two-coat system are set forth in Table 2.

EXAMPLES 13 AND 14

Examples 13 and 14 are comparison examples wherein Component (A) does not have the required properties, particularly with regard to the viscosity on dilution.

Table 2 is as follows:

TABLE 2

| Components | \multicolumn{15}{c}{Examples} | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14(V) | 15(V) |
| A 1 | 21.30 | 21.30 | 28.30 | 4.80 | 27.40 | 20.10 | — | — | — | — | — | — | — | — | — |
| A 2 | — | — | — | — | — | — | 21.30 | — | — | — | — | — | — | — | — |
| A 3 | — | — | — | — | — | — | — | 21.50 | — | — | — | — | — | — | — |
| A 4 | — | — | — | — | — | — | — | — | 22.83 | — | — | — | — | — | — |
| A 5 | — | — | — | — | — | — | — | — | — | 25.05 | — | — | — | — | — |
| A 6 | — | — | — | — | — | — | — | — | — | — | 22.83 | — | — | — | — |
| A 7 | — | — | — | — | — | — | — | — | — | — | — | 24.12 | — | — | — |
| A 8 | — | — | — | — | — | — | — | — | — | — | — | — | 25.56 | — | — |
| A 9 | — | — | — | — | — | — | — | — | — | — | — | — | — | 24.10 | — |
| A 10 | — | — | — | — | — | — | — | — | — | — | — | — | — | — | 18.30 |
| E 1 | 8.80 | — | — | 3.90 | — | 8.80 | 8.80 | 8.80 | 8.80 | 8.80 | 8.80 | 8.80 | 8.80 | 8.80 | 8.80 |
| E 2 | — | 5.75 | — | — | — | — | — | — | — | — | — | — | — | — | — |
| Ethanol | 9.60 | 12.65 | 9.70 | — | 9.40 | 9.60 | 9.60 | 9.40 | 8.07 | 5.85 | 8.07 | 6.78 | 5.34 | 6.80 | 12.60 |
| DMEA | 4.20 | 4.20 | 5.30 | — | 5.10 | 4.00 | 4.20 | 6.00 | 4.20 | 4.20 | 4.20 | 4.20 | 4.20 | 6.00 | 16.80 |
| C 1 | 10.20 | 10.20 | 10.30 | — | 10.00 | 10.20 | 10.20 | 10.20 | 10.20 | 10.20 | 10.20 | 10.20 | 10.20 | 10.20 | 10.20 |
| C 2 | — | — | — | 41.90 | — | — | — | — | — | — | — | — | — | — | — |
| C 3 | — | — | — | — | — | 2.80 | — | — | — | — | — | — | — | — | — |
| C 4 | — | — | — | — | — | 1.50 | — | — | — | — | — | — | — | — | — |
| NMP | 9.60 | 9.60 | 9.70 | — | 9.40 | 9.60 | 9.60 | 9.60 | 9.60 | 9.60 | 9.60 | 9.60 | 9.60 | 9.60 | 9.60 |
| Water | 25.90 | 25.90 | 26.20 | 39.00 | 25.30 | 23.00 | 25.90 | 24.10 | 25.90 | 25.90 | 25.90 | 25.90 | 25.90 | 24.10 | 13.30 |
| D 1 | 10.40 | 10.40 | 10.50 | — | — | 10.40 | 10.40 | 10.40 | 10.40 | 10.40 | 10.40 | 10.40 | 10.40 | 10.40 | 10.40 |
| D 2 | — | — | — | — | 13.40 | — | — | — | — | — | — | — | — | — | — |
| D 3 | — | — | — | 10.40 | — | — | — | — | — | — | — | — | — | — | — |
| (I) | K | K | K | K | K | K | K | K | K– | K– | K– | K– | K | V K– | V K– |
| (II) | \multicolumn{9}{c}{←no sagging→} | | | | | | | | | | | | G | G |
| (III) | 1 | 1 | 1 | 1 | 1 | 1 | 1 | 1 | 2 | 2 | 2 | 2 | 1 | 3 | 3 |

Key to Table 2:
(V) Comparison example
DMEA dimethylethanolamine (10% aqueous solution)
NMP N—methylpyrrolidone
(I) Storage stability of base coats (7 days/50° C.)
   K = no change
   K– = slight phase separation
   V = greying of aluminum particles
(II) Performance on application
   G = strong sagging, "curtaining"
(III) Evaluation of the cured two-coat film
   1 = excellent metallic effect, radiant brilliance
   2 = excellent metallic effect, satisfactory brilliance
   3 = cloudy metallic effect, fair brilliance As will be apparent to one skilled in the art, various modifications can be made within the scope of the aforesaid description. Such modifications being within the ability of one skilled in the art form a part of the present invention and are embraced by the appended claims.

It is claimed:

1. Water-dilutable coating compositions for use in a base coat for wet-on-wet application of finishes comprising (A) 10–40% b.w. of at least one copolymer with a glass transition temperature of between −55° C. and +25° C. and containing (Aa) 40–60% b.w. of vinyl and vinylidene compounds free of functional groups other than the $\alpha,\beta$-ethylenically unsaturated group, (Ab) 30–40% b.w. of hydroxyalkyl esters of (meth)acrylic acid, maleic acid or fumaric acid, and/or (Ac) 30–40% b.w. of N-methylol(meth)acrylic acid amide, (Ad) 2–17% b.w. of (meth)acrylic acid amide, (Ae) 0–8% b.w. of $C_1$–$C_4$-alkoxymethylated N-methylol (meth)acrylic acid amide, (Af) 2–8% b.w. of $\alpha,\beta$-ethylenically unsaturated monocarboxylic acids, and (Ag) 0–0.8% b.w. of a multiple $\alpha,\beta$-ethylenically unsaturated compound, with the condition that a 60% solution of the copolymer in ethanol, after neutralization of the carboxy groups with ammonia to a pH-value of 7.2 to 7.5, measured as a 20% solution in water, can be diluted with water to provide a clear solution, or with a slight turbidity only, to a solids content of 20% and that the solution, on dilution with water, to a solids content of from 25–40% has a maximum viscosity of over 5 Pa.s, (B) 5–40% b.w. of a mixture of (Ba) 20–80% b.w. of one or more solvents with an evaporation number according to DIN 53 170 of below 30, and (Bb) 20–80% b.w. of one or more solvents with an evaporation number according to DIN 53 170 of over 60, is completely miscible with water at ambient temperature, and not miscible with benzine hydrocarbon solvents having a boiling range of from 80° to 110° C. and a content of aromatic hydrocarbons of maximum 5%, (C) 1–30% b.w. of one or more coloring and/or optical effect imparting components, (D) 0–20% b.w. of one or more dispersions stable in the paint composition, based on vinyl polymers, polycondensates or polyaddition resins, and (E) 0–20% b.w. of one or more partially or totally etherified amine-formaldehyde condensates.

2. The water-dilutable coating compositions according to claim 1 wherein said compositions contain at least one member of the group consisting of extenders and auxiliary organic solvents.

3. The water-dilutable coating compositions according to claim 1 wherein the compositions include a metallic pigment as Component (C).

4. The water-dilutable coating compositions according to claim 1 wherein Component (A) is present at from about 15 to about 30% b.w.

5. The water-dilutable coating compositions according to claim 4 wherein Component (A) has a glass transition temperature of between about −50° C. and about 0° C.

6. The water-dilutable coating compositions according to claim 1 wherein Component (Af) is (meth)acrylic acid.

7. The water-dilutable coating compositions according to claim 1 wherein Component (Ag) is present as divinylbenzol.

8. The water-dilutable coating compositions according to claim 1 wherein Component (B) is present at from about 15 to about 35% b.w.

9. The water-dilutable coating compositions according to claim 1 wherein Component (D) is present in an amount of from about 5 to about 15% b.w.

10. The water-dilutable coating compositions according to claim 1 wherein Component (E) is present in an amount of from about 3 to about 12% b.w.

11. The water-dilutable coating compositions according to claim 1 wherein Component (A) is a solution polymer produced, in situ, in one of the solvents of Component (B).

* * * * *